Dec. 8, 1931.  F. A. DAVIDSON  1,835,473
COUPLING DEVICE
Filed Aug. 8, 1930
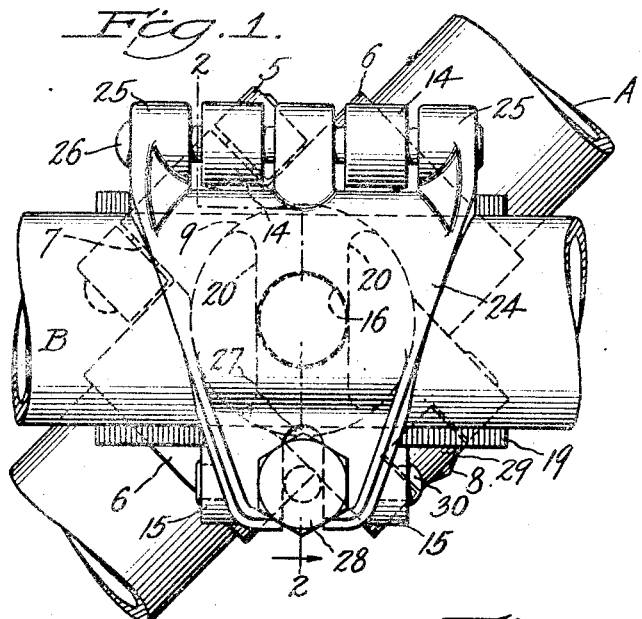
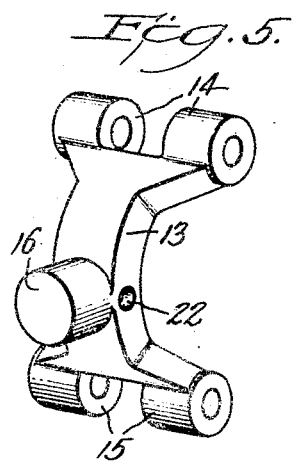
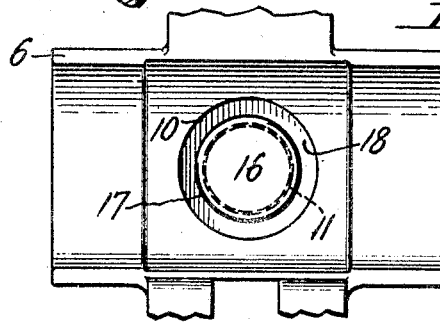
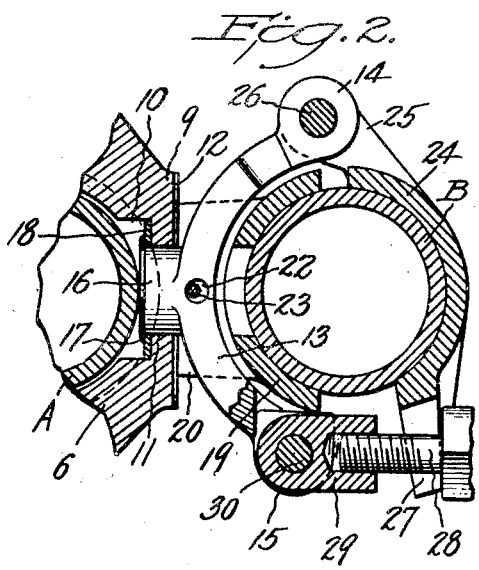
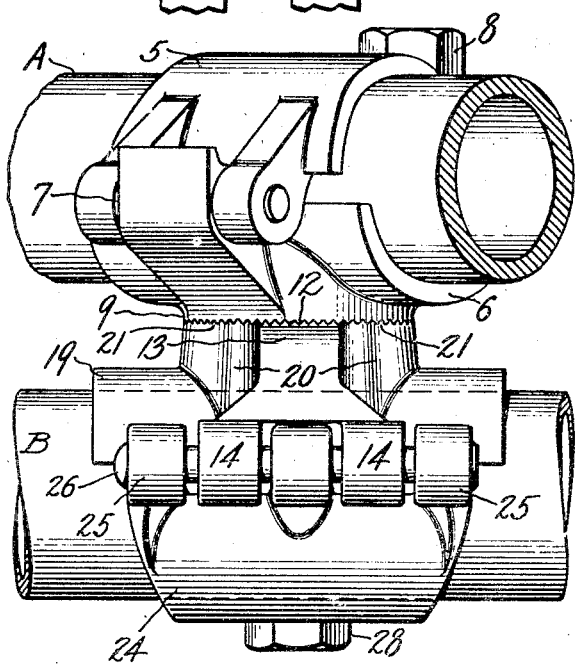
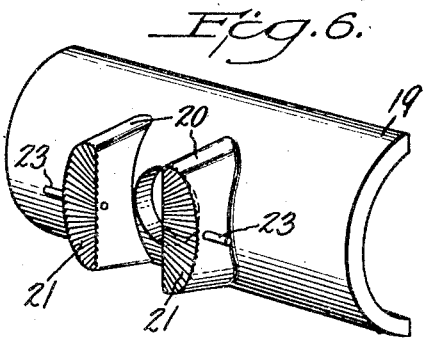
Inventor
F. A. DAVIDSON
By his Attorney Patented Dec. 8, 1931

1,835,473

UNITED STATES PATENT OFFICE

FREDERIC A. DAVIDSON, OF BAYSIDE, NEW YORK, ASSIGNOR TO AMERICAN SAFETY DEVICE CO., OF NEW YORK, N. Y., A CORPORATION OF NEW YORK

COUPLING DEVICE

Application filed August 8, 1930. Serial No. 473,931.

This invention relates to coupling devices, and has for its general object and purpose to provide certain improvements in coupling devices of that type used for the purpose of rigidly connecting angularly related cylindrical elements of temporary frame structures with each other. Such structures, composed of sections of metal tubing including diagonally positioned bracing elements are now more or less widely employed for the purpose of supporting scaffolding, as the frame work of safety enclosures for hoistways, and for various other purposes in the erection or remodeling of buildings.

It is a particular object of my present improvements to provide a coupling device of this kind consisting of sectional clamps swiveled together for engagement with adjacent angularly related tubular elements and embodying means whereby the clamps may be rigidly held or fixed in their angularly adjusted positions with respect to each other after they have been engaged with the respective tubular elements while permitting of the disconnection of the opposed sections of the two clamps in order to enable such relative adjustment of the clamps to be made before final attachment to the tubular elements.

More particularly, in a practical embodiment of the invention, one of the clamps consists of the usual two hingedly connected sections to embrace one of the tubular elements while the other clamp includes a part swiveled to one section of the first clamp and a clamping plate associated therewith to engage one side of the other tubular element having parts embracing said plate and said parts and the opposed section of the first clamp having coacting means whereby said plate is locked against swiveling movement, and a second clamping plate hingedly connected with one end of said swiveled plate to engage the opposite side of said tubular element. It is one of the features of my present invention to provide means for loosely connecting said swiveled plate and the associated clamping plate with each other whereby the latter may be moved axially of the swivel connection in order to release the same from locked engagement with the opposed part of the other clamp so that the two clamps may be angularly positioned in proper relation with each other.

It is another object of the invention to provide an improved coupling device of the above character, the several parts of which are of simple form and may be readily assembled and which will possess maximum strength and durability.

With the above and other objects in view, the invention consists of the improved coupling device, and in the several parts thereof as may be hereinafter more fully described, illustrated in the accompanying drawings, and subsequently incorporated in the subjoined claims.

In the drawings, wherein I have illustrated one simple and satisfactory embodiment of the invention, and in which similar reference characters designate corresponding parts throughout the several views,—

Figure 1 is a side elevation illustrating one form of my improved coupling device and showing one of the connected tubular elements disposed at an angle of substantially 45° with respect to the other;

Fig. 2 is a fragmentary transverse sectional view taken substantially on the line 2—2 of Fig. 1;

Fig. 3 is a top plan view;

Fig. 4 is a detail fragmentary interior elevation of one section of one of the clamps;

Fig. 5 is a detail perspective view of the swiveled part of the other clamp, and Fig. 6 is a similar view of the plate or section of the latter clamp which cooperates with said swiveled part.

Referring in detail to the drawings, my improved coupling device includes a clamp consisting of two sections 5 and 6 respectively, which are hingedly connected with each other as indicated at 7. These clamp sections are adapted to embrace one of the tubular elements A to be coupled and closely engage upon the opposite sides thereof, the other or free ends of the clamp sections being adjustably connected with each other by the bolt indicated at 8 preferably in the manner illustrated in Fig. 2 of the drawings, and as will be hereinafter referred to in greater detail. The clamp section 5 may be of the substantially triangular shaped form illustrated in Fig. 1 of the drawings, while the section 6 is of uniform width and of greater elongation to provide an extensive bearing surface on one side of the tubular element A.

The section 6 of the clamp above referred to is provided upon its outer convex surface and substantially centrally thereof with a slight outwardly projecting boss or circular enlargement indicated at 9, the inner face of said clamp section having a circular recess 10 formed therein in concentric relation to said boss, and thereby providing a reduced wall section through which the central opening 11 is formed. The face of the boss 9 is provided with the fine teeth or serrations 12 extending in radial relation to the opening 11.

The other clamp includes a relatively narrow longitudinally curved plate 13 which is provided at each of its ends with the spaced hinge knuckles 14 and 15 respectively. The plate 13 is provided centrally thereof with a stud or gudgeon 16 projecting from its convex surface. This stud is loosely fitted through the opening 11 in the section 6 of the other clamp and the end thereof is swaged outwardly as indicated at 17 upon the washer plate 18 seated against the base wall of the recess 10 around said stud. It will be noted that the length of this stud is such that the point of juncture between the same and the convex face of the plate 13 is very closely adjacent to the inner ends of the serrations 12 surrounding the opening 11, thus substantially eliminating any axial play of the stud 16 in said opening.

A transversely curved clamping plate 19 engages one side of the other tubular element B which is opposed to the element A. This plate is provided on its convex surface with spaced lugs 20, the end faces of which are toothed or serrated as at 21 along radial lines to cooperate with the teeth or serrations 12 of the section 6 of the other clamp, the said lugs 20 straddling the swiveled plate 13. This plate is provided in its opposite lateral edges with the recesses indicated at 22 to receive the inner ends of pins 23 of relatively small diameter which extend through the lugs 20. Thus, as will be seen from reference to Fig. 2 of the drawings, the clamping plate 19 is loosely connected with the swiveled plate 13, the play of the pins 23 in the recesses 22 being sufficient to enable the locking teeth or serrations 21 on the lugs 20 to be disengaged from the teeth or serrations 12.

The clamping plate 24 opposed to the plate 19 for engagement from the opposite side of the tubular element B is provided at one of its ends with the spaced hinge knuckles 25 which are hingedly connected with the knuckles 14 at one end of the plate 13 by the pintle 26. The other end of the plate 24 is slotted as at 27 to receive the shank of the clamping bolt 28 which is adjustably engaged in the threaded socket of the part 29 swiveled between the knuckles 15 on the other end of the plate 13 upon the hinge pintle 30.

In the use of the coupling device as above described, the parts 5 and 6 of one clamp are first secured upon one of the tubular elements, and while the plate 19 of the other clamp is pulled outwardly away from the clamping plate 6, said latter clamp is turned and adjusted in the proper angular position to receive the other of the tubular elements. One side of said tubular element is then seated against the face of the concave plate 19, and the serrated end faces 21 of the lugs 20 on said plate are engaged with the complementary serrations 12 of the section 6 of the other clamp. After the plate 24 is positioned against the opposite side of the tubular element, the bolt 28 is adjusted to tightly bind said plate against the tubular element. The swiveled plate 13 is pulled outwardly so that the inner end 17 of the stud 16 binds tightly against the washer plate 18. As the clamp is tightened, the pressure transmitted through the tubular element B to the plate 19 securely interlocks the teeth or serrations 12 and 21 with each other, thus effectively precluding any relative turning or pivoting movement of the two clamps from their adjusted positions. Also, it is impossible to release this connection by any pressures applied against the tubular elements A and B, tending to move the same apart or away from each other, since there is no axial movement of the stud 16 through the opening 11 sufficient to permit disengagement of the teeth or serrations 12 and 21 from each other. Thus absolute security in the coupled connection between the tubular elements A and B is obtained. Accordingly, in any frame structure wherein my improved coupling devices are employed for connecting the several angularly related tubular sections or parts thereof, maximum rigidity and the highest degree of safety is assured.

In the above description, I have referred to a mechanical embodiment of my present improvements which has been severely tested and given highly satisfactory results in practical use. However, with respect to the form of the several parts of the two clamps, the manner of their connection and the adjustable means for detachably clamping the parts upon the tubular elements, it will be apparent that many variations thereof may be employed. It will accordingly, be understood that I may embody the essential features of my improvements in other alternative structural forms, as may be fairly incorporated within the spirit and scope of the invention as claimed.

I claim:

1. A coupling device comprising two clamps, each consisting of complementary sections to engage one of the elements to be coupled, a member having a swiveled connection with a section of one clamp, one section of the other clamp being hingedly connected to one end of said member, means adjustably connecting said last named clamp section and the member at their other ends, the other section of the latter clamp having parts straddling said member, and means loosely connecting said latter clamp section with said member for movement axially of the swiveled connection whereby said parts may be cooperatively engaged with said section of the first named clamp or disengaged therefrom to permit of relative angular adjustment of said clamps.

2. A coupling device comprising two clamps, each consisting of complementary sections to engage one of the elements to be coupled, a member having a swiveled connection with a section of one clamp, one section of the other clamp being hingedly connected to one end of said member, means adjustably connecting said last named clamp section and the member at their other ends, the other section of the latter clamp having parts straddling said member, and means connecting each of said parts with said member for sliding movement axially of the swiveled connection, whereby said parts may be cooperatively engaged with said section of the first named clamp or disengaged therefrom to permit of relative angular movement of said clamps.

3. A coupling device comprising two clamps, each consisting of complementary sections to engage one of the elements to be coupled, a member having a swiveled connection with a section of one clamp, one section of the other clamp being hingedly connected to one end of said member, means adjustably connecting said last named clamp section and the member at their other ends, the other section of the latter clamp having parts straddling said member, said member being provided in opposite edges with recesses, and a pin fixed in each of said parts of the clamp section loosely engaged in the respective recesses and permitting limited movement of the clamp section axially of said swiveled connection to cooperatively engage said parts with said section of the first named clamp or disengage the same therefrom to permit of relative angular adjustment of said clamps.

4. A coupling device comprising two clamps, each consisting of complementary sections to engage one of the elements to be coupled, a member having a swiveled connection with a section of one clamp, one section of the other clamp being hingedly connected to one end of said member, means adjustably connecting said last named clamp section and the member at their other ends, the other section of the latter clamp having parts straddling said member, each of said parts and said section of the first named clamp having coacting means to lock said clamps against swiveling movement, and means permanently connecting said last named section of the second named clamp with said member and permitting of relative movement of said clamp section axially of the swiveled connection to disengage the locking means whereby said clamps may be angularly adjusted relative to each other.

5. A coupling device comprising a pair of clamps for retaining tubular members therein, each of said clamps consisting of complementary sections, a swivel member contained within one section of the first clamp in connection with an adjacent section of the second clamp, said adjacent sections having interlocking coacting means for preventing relative angular movement of the clamps, and means for locking the sections of the first clamp whereby the compression on the tubular member within the clamp is distributed to the swivel member and the adjacent clamp section to interlock the coacting means and prevent angular movement of said clamps.

In testimony that I claim the foregoing as my invention, I have signed my name hereto.

FREDERIC A. DAVIDSON.